(12) United States Patent
Nishimura et al.

(10) Patent No.: US 9,637,173 B2
(45) Date of Patent: May 2, 2017

(54) SIDE VEHICLE-BODY STRUCTURE OF AUTOMOTIVE VEHICLE

(71) Applicant: MAZDA MOTOR CORPORATION, Hiroshima (JP)

(72) Inventors: Yoshikazu Nishimura, Hiroshima (JP); Katsuhito Kouno, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/735,813

(22) Filed: Jun. 10, 2015

(65) Prior Publication Data

US 2016/0023683 A1    Jan. 28, 2016

(30) Foreign Application Priority Data

Jul. 24, 2014    (JP) ................................ 2014-150346

(51) Int. Cl.
| | | |
|---|---|---|
| *B62D 21/15* | (2006.01) | |
| *B62D 27/02* | (2006.01) | |
| *B62D 25/04* | (2006.01) | |
| *B62D 25/02* | (2006.01) | |

(52) U.S. Cl.
CPC ........... *B62D 21/157* (2013.01); *B62D 25/02* (2013.01); *B62D 25/04* (2013.01); *B62D 27/02* (2013.01); *B62D 27/023* (2013.01)

(58) Field of Classification Search
CPC .... B62D 21/157; B62D 25/025; B62D 25/04; B60N 2/4235; B60N 2/42736; B60N 2/68; B60N 2/01; B60N 2/015; B60N 2/427; B60J 5/0451; B60J 5/0458; B60J 5/0461; B60J 5/0437; B60J 5/0443; B60J 5/0444

USPC ......... 296/193.01, 187.12, 193.06, 1.03, 29, 296/187.03, 193.05, 203.03; 29/897.3
See application file for complete search history.

(56) References Cited

U.S. PATENT DOCUMENTS

| | | | | | |
|---|---|---|---|---|---|
| 6,129,410 | A  * | 10/2000 | Kosaraju | ................ | B62D 25/04 |
| | | | | | 296/146.11 |
| 7,152,914 | B2 * | 12/2006 | Dingman | ................ | B62D 25/04 |
| | | | | | 296/193.05 |
| 7,357,448 | B2 * | 4/2008 | Chen | ...................... | B62D 25/04 |
| | | | | | 296/187.12 |
| 7,510,234 | B2 * | 3/2009 | Ameloot | ................ | B62D 25/04 |
| | | | | | 296/187.12 |
| 7,959,217 | B2 * | 6/2011 | Onuma | .................. | B62D 25/04 |
| | | | | | 296/146.11 |

(Continued)

FOREIGN PATENT DOCUMENTS

| | | |
|---|---|---|
| JP | H04-119282 U | 10/1992 |
| JP | 2009-113769 A | 5/2009 |
| JP | 2015-089792 A | 5/2015 |

*Primary Examiner* — Glenn Dayoan
*Assistant Examiner* — Sunsurraye Westbrook
(74) *Attorney, Agent, or Firm* — Studebaker & Brackett PC

(57) ABSTRACT

A ridgeline portion is provided at a pillar inner panel such that the ridgeline portion extends substantially vertically from a side sill (a roof side rail), and a load-transmission restraint portion is provided between the ridgeline portion and a welding portion of a pillar end portion where the pillar inner panel is welded to a pillar outer panel or a pillar reinforcement, and the side sill (the roof side rail), the load-transmission restraint portion being configured to have a longitudinal width which is wider than that of a central portion, in the vertical direction, of a center pillar and be substantially flat.

9 Claims, 15 Drawing Sheets

(56) References Cited

U.S. PATENT DOCUMENTS

| | | | |
|---|---|---|---|
| 8,419,113 B2* | 4/2013 | Kunishi | B62D 21/157 |
| | | | 296/187.12 |
| 2011/0210581 A1 | 9/2011 | Kunishi et al. | |
| 2015/0147111 A1* | 5/2015 | Teague | B62D 25/04 |
| | | | 403/271 |

* cited by examiner

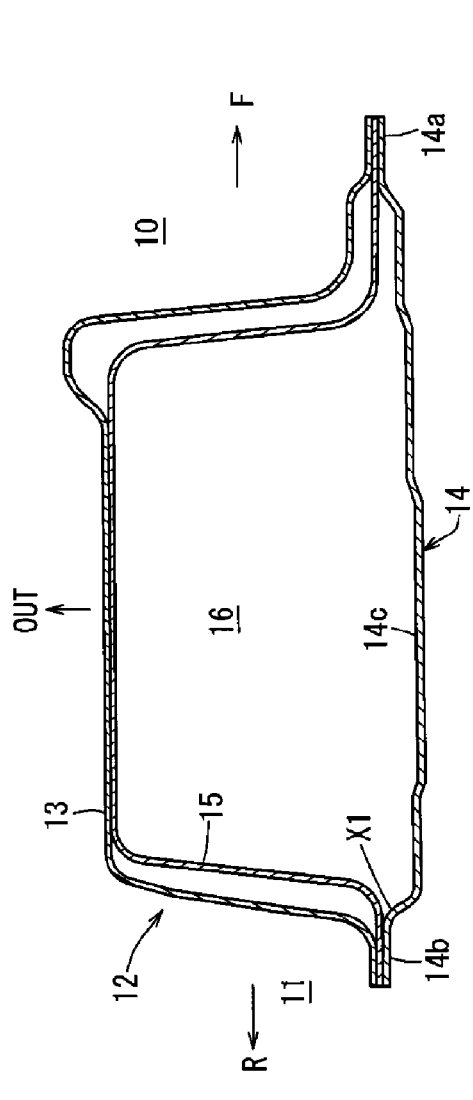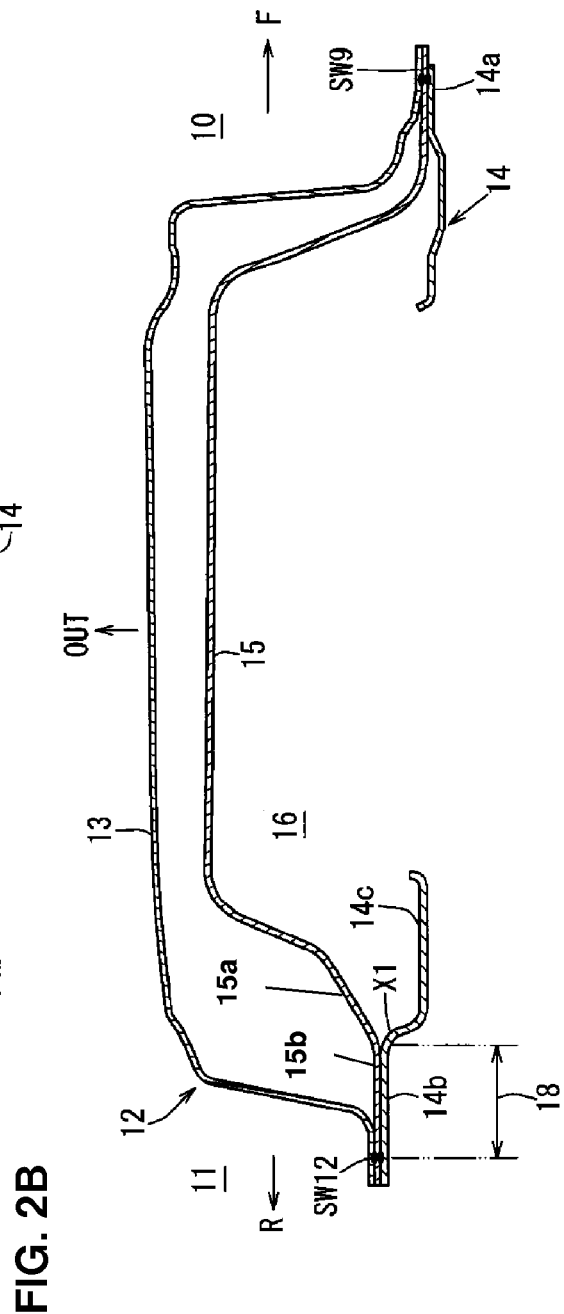
FIG. 2A
FIG. 2B

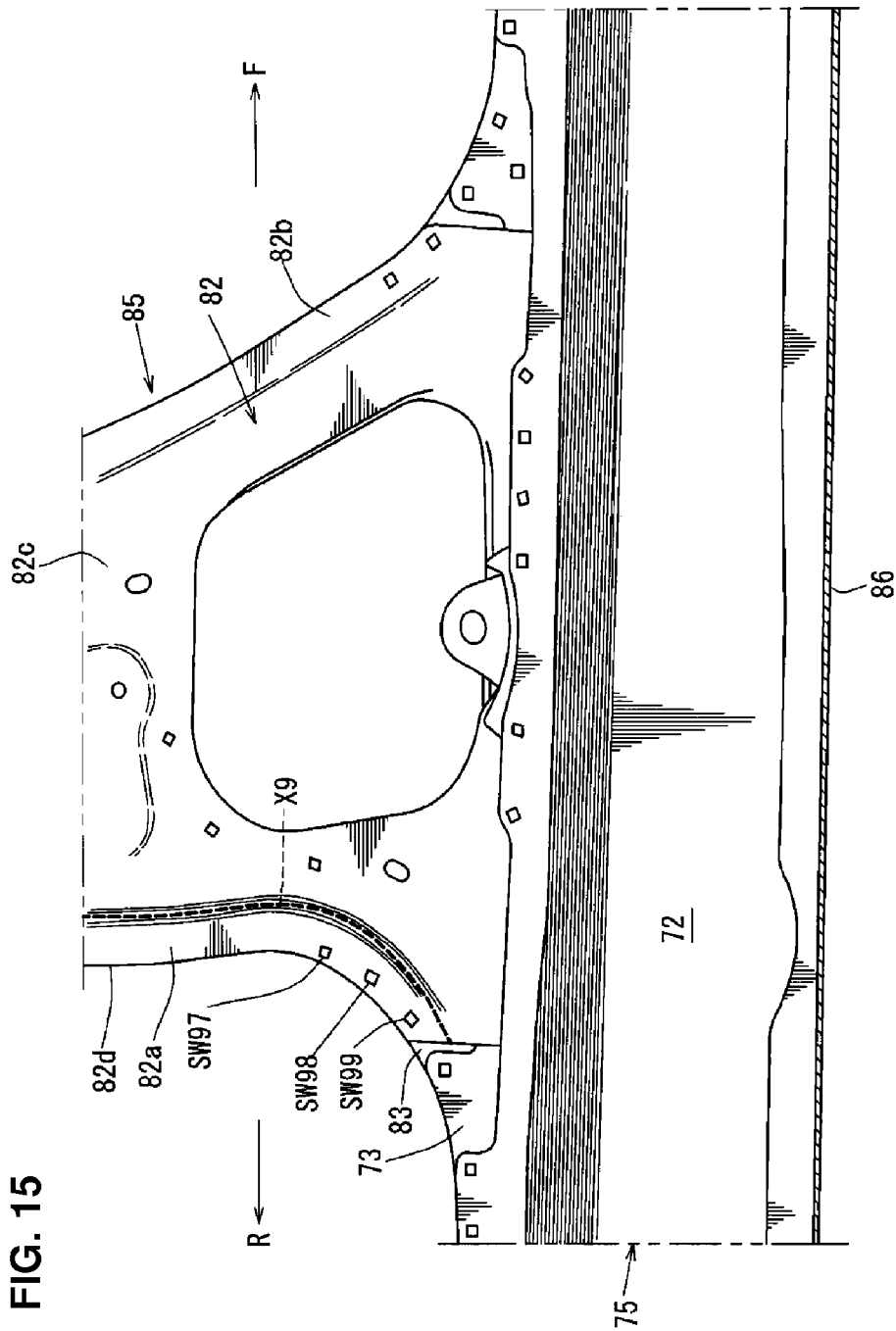

SIDE VEHICLE-BODY STRUCTURE OF AUTOMOTIVE VEHICLE

BACKGROUND OF THE INVENTION

The present invention relates to a side vehicle-body structure of an automotive vehicle which comprises a center pillar, an upper end of which is fixedly joined to a roof side rail and a lower end portion of which is fixedly joined to a side sill, the center pillar having a closed cross section extending in a vertical direction which is formed by a pillar outer panel and a pillar inner panel or a pillar reinforcement.

In general, a structure shown in FIG. 14 is known as an example of a side vehicle-body structure of an automotive vehicle. As shown in FIG. 14, a vehicle-body lower portion of this structure comprises a side sill outer 71, a side sill inner 72, a side sill reinforcement 73, thereby forming a side sill 75 which is a vehicle-body reinforcing member having a side-sill closed cross section 74 extending in a vehicle longitudinal direction. Meanwhile, a vehicle-body upper portion of this structure comprises a roof side rail outer 76, a roof side rail inner 77, and a roof side rail reinforcement 78, thereby forming a roof side rail 80 which is another vehicle-body reinforcing member having a roof-side closed cross section 79 extending in the vehicle longitudinal direction.

Further, there is provided a center pillar 85 which is another vehicle-body reinforcing member, an upper end of which is fixedly joined to the roof side rail 80 and a lower end portion of which is fixedly joined to the side sill 75, wherein the center pillar 85 has a center-pillar closed cross section 84 extending in a vertical direction which is formed by a pillar outer panel 81, a pillar inner panel 82, and a pillar reinforcement 83.

According to the side vehicle-body structure of the automotive vehicle shown in FIG. 14, there are, as a structure to receive a side-collision load (a load generated in a collision of a barrier Z as a collision object) in a side collision, a structure shown in a broken line denoted by reference character α, in which the side sill 75 is displaced (moved) inward with no bending of the center pillar 85 and another structure shown in a two-dotted broken line denoted by reference character β, in which a lower portion of the center pillar 85 is bent.

In the former structure, no bending occurs substantially at a collision portion of the center pillar 85 in the side collision and the lower end portion of the center pillar 85 is displaced (moved) inward with a supporting point of its upper end portion, so that most of the side-collision energy is received at the side sill 75 and its vehicle-body lower structure. This structure adopts configuration in which the lower portion of the center pillar 85 extends relatively long in the vehicle longitudinal direction, and the center pillar 85 and the side sill 75 are welded without connecting a ridgeline formed at a vehicle-compartment inside of the center pillar 85 and the side sill 75. However, there is a problem in that the lower portion of the center pillar 85 extends in the longitudinal direction, so that a material yield may be low when pressing process is applied to the center pillar, thereby increasing costs improperly.

In the latter structure, the upper end portion of the center pillar 85 is welded to the roof side rail 80 and the lower end portion of the center pillar 85 is welded to the side sill 75, so that the center pillar 85 bends at the collision portion which the barrier Z collides with in the side collision (particularly, at the portion which a position Z1 of the barrier Z collides with). Herein, the side-collision energy is absorbed by the bending of the center pillar 85.

FIG. 15 is a side view of the side vehicle-body structure of the automotive vehicle which adopts the above-described latter structure. In FIG. 15, small rectangular portions indicated in white show a spot-welding portion.

In the conventional structure shown in FIG. 15, a joint flange portion 82a which is formed at a rear side of the pillar inner panel 82 is spot-welded to the pillar reinforcement 83 and the pillar outer panel 81 (see FIG. 11) at plural welding portions SW97, SW98, SW99. Further, an inner panel body 82c is formed between a front-side joint flange portion 82b of the pillar inner panel 82 and the rear-side flange portion 82a, and a ridgeline portion X9 is formed between the rear-side joint portion 82a and the inner panel body 82c such that the ridgeline portion X9 extends along a rear-end edge 82d of the joint flange portion 82a, that is, the ridgeline portion X9 extends in the vertical direction roughly in parallel to the rear-end edge 82d.

The center pillar 85 of FIG. 15 is a structural object which receives the side-collision load and prevents deformation of a vehicle body on a vehicle-compartment side. Since the above-described ridgeline portion X9 has a high rigidity, the side-collision load is transmitted to the side sill 75 via the ridgeline portion X9. Herein, when a tearing-off stress transmitted from the ridgeline portion X9 increases, the welding portion SW99 of the pillar end peels off, so that the other welding portions SW98, SW97 peel off at once. Consequently, the proof stress, in a vehicle width direction, of the center pillar 85 decreases, and therefore there is a problem in that the degree of an inward displacement of the center pillar 85 may improperly increase.

In particular, in a vehicle, such as SUV (Sport Utility Vehicle), which has a high vehicle-height and the high side sill 75, since the center pillar 85 receives the side collision at its lower portion, the stress is concentrated at the lower portion of the center pillar. Accordingly, the welding portion SW99 of the lower end portion of the center pillar 85 is made to peel off by an excessive load or tore off together with a surrounding base metal. In FIGS. 14 and 15, reference numeral 86 denotes a floor panel and reference numeral 87 denotes a roof panel.

In the meantime, Japanese Patent Laid-Open Publication No. 2009-113769 discloses a structure, in which a center pillar composed by a pillar inner panel and a pillar outer panel is joined to a side sill composed by a side sill inner and a side sill outer, and plural ridgeline portions provided at the pillar outer panel are configured to extend toward welding portions of the pillar outer panel and the side sill outer, whereby the side-collision stress can be dispersed to the plural welding portions via the plural ridgeline portions.

However, configuring such that the ridgeline portions extend toward the welding portions at an area where the side-collision stress is concentrated may not be suitable in protecting the welding portions against the excessive load in order to prevent the peeling-off of the welding portions.

Further, US Patent Application Publication No. 2011/0210581 A1 discloses a structure, in which there is provided a center pillar, an upper end portion of which is fixedly joined to a roof side rail and a lower end portion of which is fixedly joined to a side sill, and plural D-shaped through holes for deformation control are formed at front-and-rear both faces of a lower portion of an outer reinforcement which is positioned inside the center pillar, whereby a base portion at a lower portion of the center pillar can be protected.

However, forming plural D-shaped through holes which are relatively large sized at an area where the side-collision stress is concentrated may improperly increase the degree of an inward displacement (movement) of the outer reinforcement of the center pillar in the vehicle's side collision. Also, since the through holes are formed at the outer reinforcement, it may be impossible to protect the welding portions of the pillar inner panel, so that there is problem in that deformation of the pillar inner panel becomes so large that the welding portions may peels off easily. Therefore, it has been desired to ensure the sufficient degree of load absorption at the center pillar and prevent an input of the excessive load to the welding portions of the pillar end portion.

SUMMARY OF THE INVENTION

Accordingly, an object of the present invention is to provide a side vehicle-body structure of an automotive vehicle which can properly prevent that the welding portion of the pillar end portion of the pillar inner panel is made to peel off by the side-collision load, ensuring the sufficient degree of the load absorption at the center pillar and preventing the input of the excessive load to the welding portion of the pillar end portion.

The present invention is a side vehicle-body structure of an automotive vehicle comprising a center pillar, an upper end of which is fixedly joined to a roof side rail and a lower end portion of which is fixedly joined to a side sill, the center pillar having a closed cross section extending in a vertical direction which is formed by a pillar inner panel and a pillar outer panel or a pillar reinforcement which are positioned on an outward side, in a vehicle width direction, of the pillar inner panel, wherein a ridgeline portion is provided at the pillar inner panel of the center pillar such that the ridgeline portion extends substantially vertically from at least one of the roof side rail and the side sill, and a load-transmission restraint portion is provided between the ridgeline portion and a welding portion of a pillar end portion where the pillar inner panel is welded to the pillar outer panel or the pillar reinforcement and the side sill or the roof side rail, the load-transmission restraint portion being configured to have a longitudinal width which is wider than that of a central portion, in the vertical direction, of the center pillar and be substantially flat. Herein, the above-described welding portion may be formed by spot welding, arc welding, lazar welding, or welding using electron beams or plasma beams.

According to the present invention, since there is provided the load-transmission restraint portion having the wide longitudinal width and being substantially flat, large deformation of the vehicle-compartment inside of the pillar inner panel, which may be caused by the side-collision load transmitted via the ridgeline portion, is properly allowed and progress of the deformation to the vicinity of the welding portion is restrained, so that both ensuring of the sufficient degree of the load absorption at the center pillar and preventing of the input of the excessive load to the welding portion of the pillar end portion can be attained properly.

Accordingly, the load-absorption deformation of the center pillar can be increased, and the deformation progress to the welding portion of the pillar end portion can be restrained, thereby preventing that the welding portion of the pillar end portion of the pillar inner panel is made to peel off by the side-collision load. Consequently, it can be restrained that the proof stress, in the vehicle width direction, of the center pillar decreases and the degree of the inward displacement of the center pillar increases.

In an embodiment of the present invention, a hole portion for deformation transmission restraint is provided between the ridgeline portion and the welding portion of the pillar end portion. Herein, it is preferable that the above-described hole portion be configured such that its peripheral length is as long as possible and its opening area is as small as possible.

According to this embodiment, a dendritic (wrinkle-shaped) stress-transmission path which grows toward the welding portion of the pillar end portion according to an enlargement of deformation difference between the ridgeline portion and the vicinity of the welding portion of the pillar end portion is received at the hole portion for deformation transmission restraint, so that the load-absorption deformation around the hole portion can be promoted. Accordingly, the deformation transmission to the vicinity of the welding portion of the pillar end portion can be restrained properly, promoting the load-absorption deformation of the pillar inner panel.

In another embodiment of the present invention, an upper portion of the hole portion which is provided between the ridgeline portion and the welding portion of the pillar end portion on the side of the side sill is configured such that a section located on the side of the ridgeline portion in a vehicle longitudinal direction has a smaller curvature-radius than a section located on the side of the welding portion of the pillar end portion in the vehicle longitudinal direction.

According to this embodiment, since the stress is easily concentrated at the above-described small curvature-radius section, deformation of a portion near the ridgeline portion can be promoted more than a portion near the welding portion. That is, the load-transmission path extends from a center-pillar load-input point side of the ridgeline portion near the welding portion of the pillar end portion (i.e., from an upper side relative to the welding portion of the pillar end portion), the transmitted load can be effectively transferred to the load-absorption deformation at the above-described section of the hole portion having the small curvature-radius. Accordingly, the deformation progress to the periphery of the welding portion of the pillar end portion can be restrained more properly compared to a case in which the hole portion is of a perfect-circular shape, so that the size of the hole portion can be set smaller. Consequently, it can be properly prevented that the proof stress, in the vehicle width direction, of the center pillar decreases.

In another embodiment of the present invention, a lower portion of the hole portion which is provided between the ridgeline portion and the welding portion of the pillar end portion on the side of the roof side rail is configured such that a section located on the side of the ridgeline portion in a vehicle longitudinal direction has a smaller curvature-radius than a section located on the side of the welding portion of the pillar end portion in the vehicle longitudinal direction.

According to this embodiment, since the stress is easily concentrated at the above-described small curvature-radius section, so that deformation of this section can be promoted. That is, the load-transmission path extends from the center-pillar load-input point side of the ridgeline portion near the welding portion of the pillar end portion (i.e., from a lower side relative to the welding portion of the pillar end portion), the transmitted load can be effectively transferred to the load-absorption deformation at the above-described section of the hole portion having the small curvature-radius. Accordingly, the deformation progress to the periphery of the welding portion of the pillar end portion can be restrained more properly compared to the case in which the hole portion is of the perfect-circular shape, so that the size of the hole portion can be set to be smaller. Consequently, it can be properly prevented that the proof stress, in the vehicle width direction, of the center pillar decreases.

Herein, it may be preferable that the hole portion which is provided between the ridgeline portion and the welding portion of the pillar end portion on the side of the side sill be configured such that an upper portion thereof is located above the welding portion of the pillar end portion in the vertical direction, or that the hole portion which is provided between the ridgeline portion and the welding portion of the pillar end portion on the side of the roof side rail be configured such that a lower portion thereof is located below the welding portion of the pillar end portion in the vertical direction. Thereby, the load-transmission path can be blocked properly by the hole portion on a central side, in the vertical direction, of the center pillar which is located above or below the welding portion of the pillar end portion.

In another embodiment of the present invention, the hole portion is formed at the pillar inner panel and covered with another panel. Thereby, proper sound insulation or water proof of the hole portion can be achieved, without adding any other shut-off member to shield the hole portion, such as a cover cap.

Other features, aspects, and advantages of the present invention will become apparent from the following description which refers to the accompanying drawings.

BRIEF DESCRIPTION OF THE DRAWINGS

FIG. 2A is a sectional view taken along line A-A of FIG. 1, and FIG. 2B is a sectional view taken along line B-B of FIG. 1.

FIG. 15 is a side view of a conventional side vehicle-body structure of an automotive vehicle, when viewed from the inside of the vehicle compartment.

DETAILED DESCRIPTION OF THE INVENTION

Embodiment 1

Figure 1:
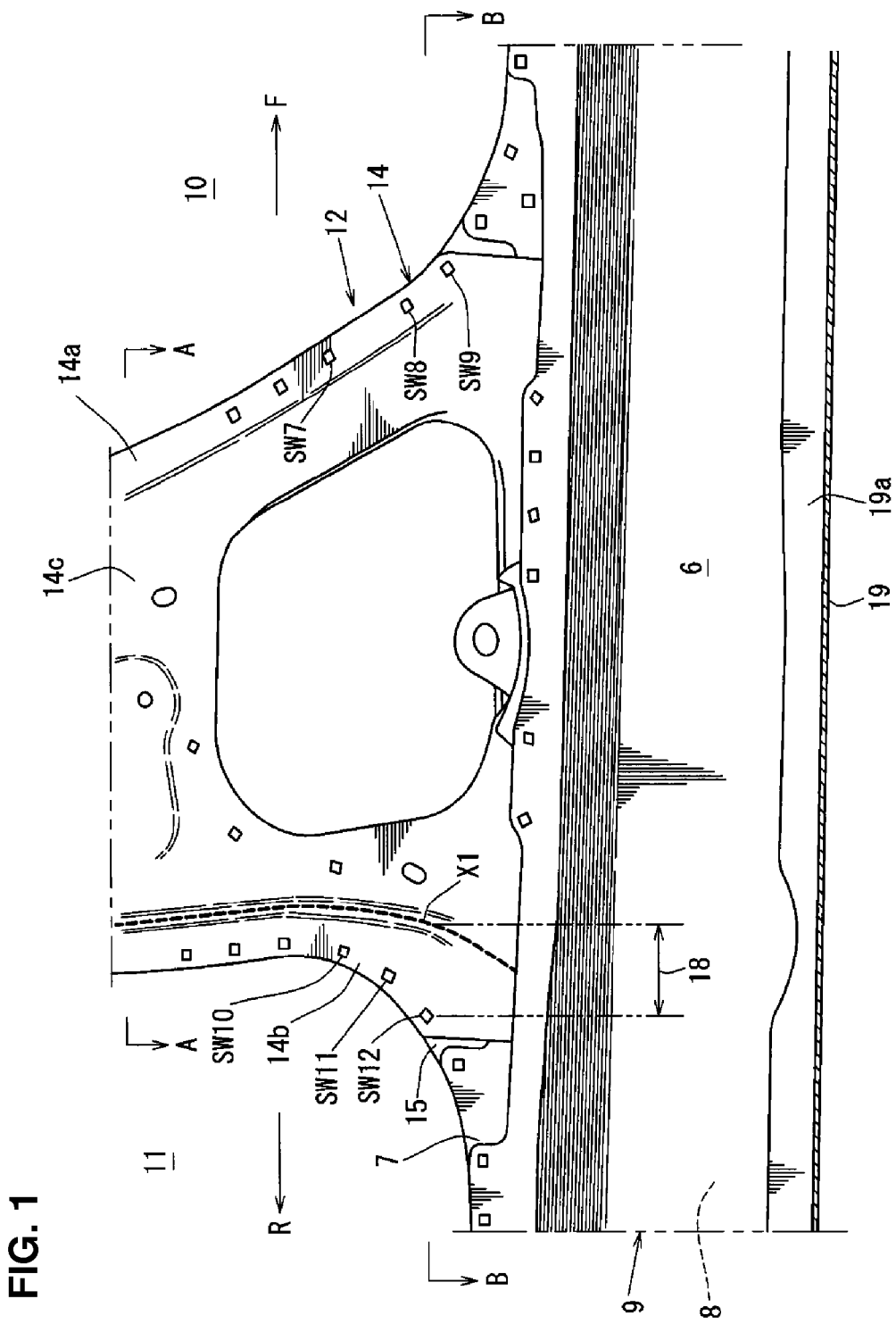
FIG. 1 is a side view of a side vehicle-body structure of an automotive vehicle according to a first embodiment of the present invention, when viewed from an inside of a vehicle compartment.
Figure 3:
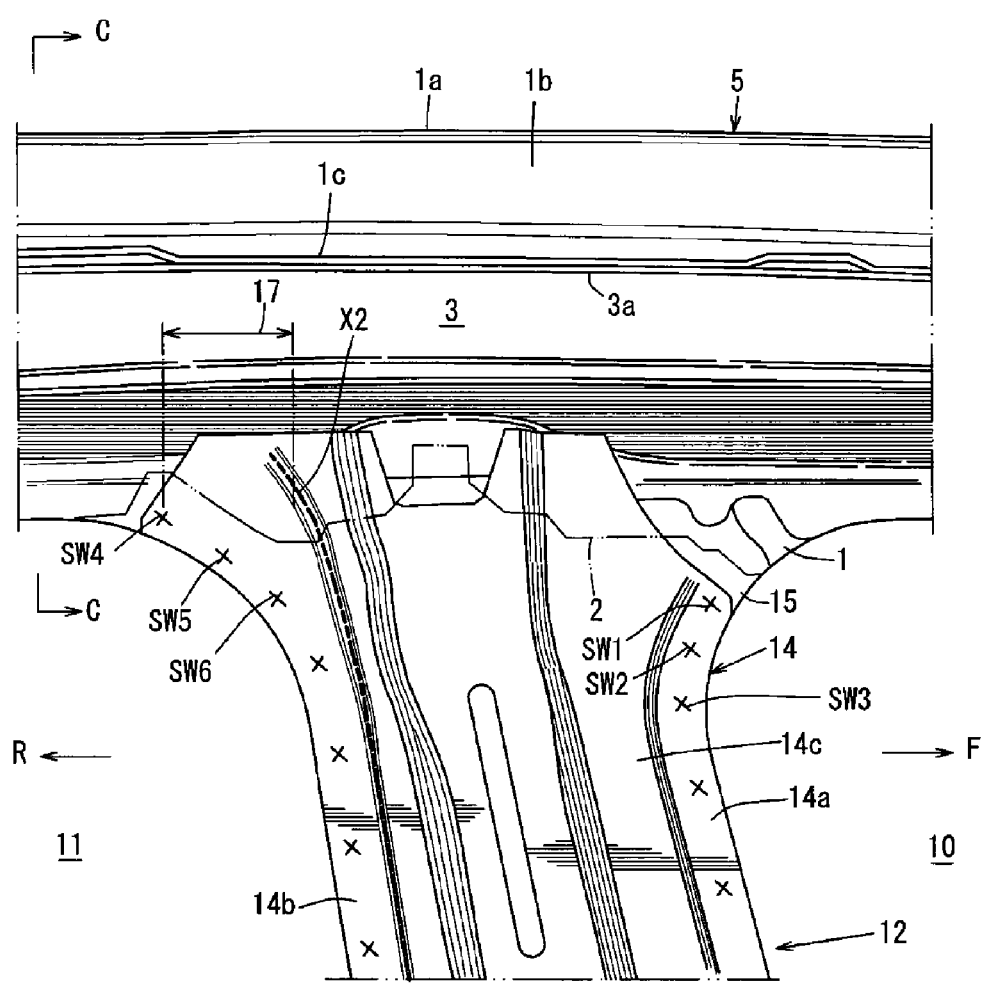
FIG. 3 is a side view of a connection portion of a roof side rail and a center pillar, when viewed from the inside of the vehicle compartment.
Figure 4:
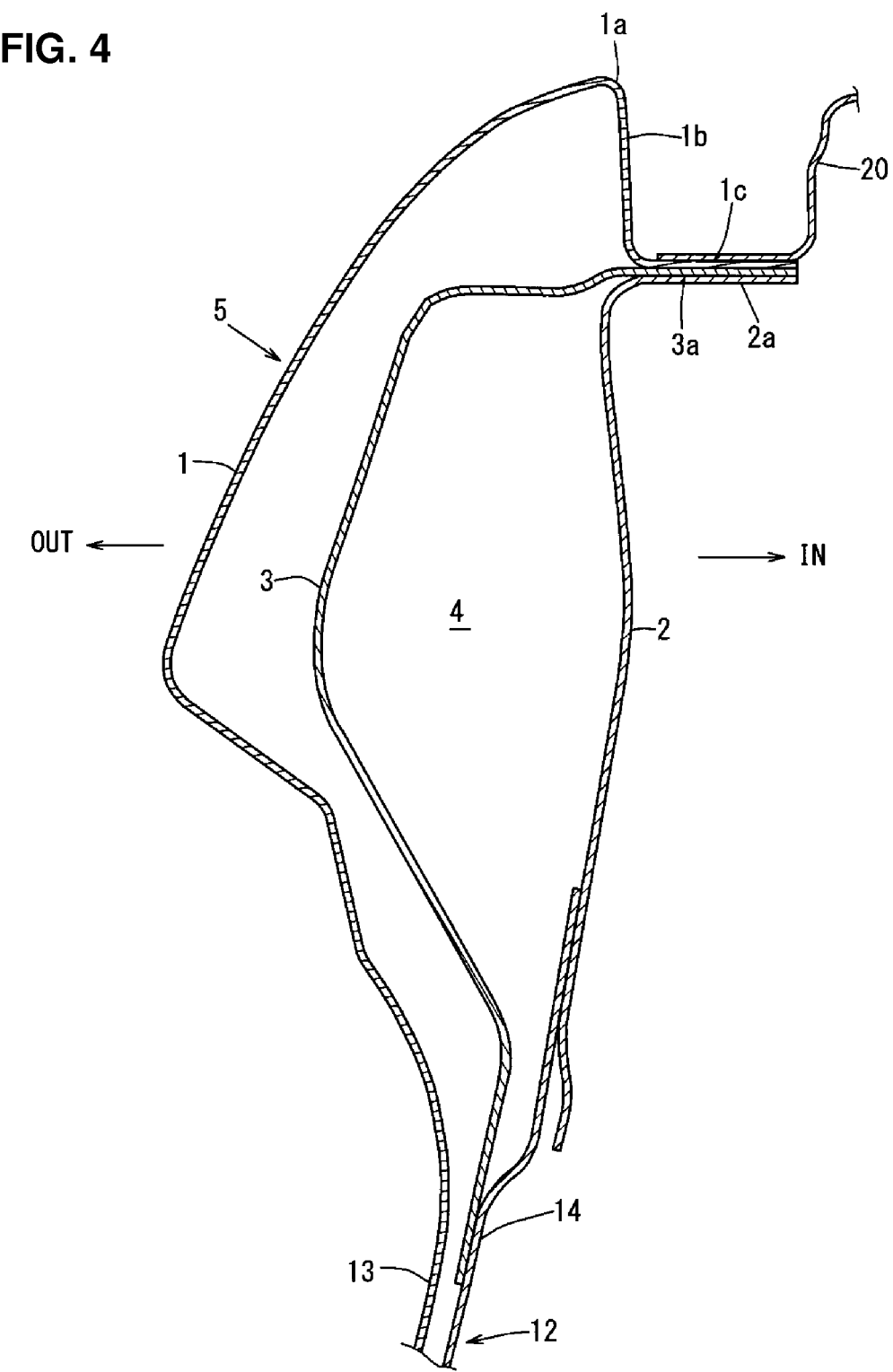
FIG. 4 is a sectional view taken along line C-C of FIG. 3.

An embodiment of the present invention will be described specifically referring to the drawings. The drawings show a side vehicle-body structure of an automotive vehicle. FIG. 1 is a side view of the side vehicle-body structure of the automotive vehicle of the present invention, when viewed from an inside of a vehicle compartment. FIG. 2A is a sectional view taken along line A-A of FIG. 1, and FIG. 2B is a sectional view taken along line B-B of FIG. 1. FIG. 3 is a side view of an upper portion of a center pillar of the side vehicle-body structure, when viewed from the inside of the vehicle compartment. FIG. 4 is a sectional view taken along line C-C of FIG. 3.

As shown in FIG. 4, a roof side rail outer 1, a roof side rail inner 2, and a roof side rail reinforcement 3a are provided at a vehicle-body upper portion, and thereby a roof side rail 5 as a vehicle-body reinforcing member which has a roof-side closed cross section 4 extending in a vehicle longitudinal direction is provided.

As shown in FIGS. 4 and 3, the roof side rail outer 1 includes a vertical wall portion 1b which extends downward from its upper end 1a and a joint flange portion 1c which extends inward, in a vehicle width direction, of a lower end of the vertical wall portion 1b. Further, the above-described roof side rail reinforcement 3 includes a joint flange portion 3a which extends inward, in the vehicle width direction, of its upper end portion.

Likewise, the above-described roof side rail inner 2 includes a joint flange portion 2a which extends inward, in the vehicle width direction, from its upper end portion. The respective flange portions 1c, 3a, 2a are fixedly joined by spot-welding means or the like.

As shown in FIG. 1, a side sill outer, a side sill inner 6, and a side sill reinforcement 7 are provided at a vehicle-body lower portion, and thereby a side sill 9 as a vehicle-body reinforcing member which has a side-sill closed cross section 8 extending in the vehicle longitudinal direction is provided.

A center pillar 12 shown in FIGS. 1 and 3 which divides a vehicle side into a front-door opening 10 and a rear-door opening 11 is fixedly joined to the roof side rail 5 at its upper end portion shown in FIG. 3, and fixedly joined to the side sill 9 at its lower end portion as shown in FIG. 1. Further, as shown in FIGS. 2A and 2B, the center pillar 12 comprises a pillar outer panel 13, a pillar inner panel 14, and a pillar reinforcement 15, and this center pillar 12 is a vehicle-body reinforcing member which has a center-pillar closed cross section 16 extending in a vehicle vertical direction.

As shown in FIG. 2, the above-described pillar inner panel 14 includes a front-side joint flange portion 14a, a rear-side joint flange portion 14b, and an inner panel body 14c which is positioned between the joint flange portions 14a, 14b.

As shown in FIG. 3, the front-side joint flange portion 14a of the pillar inner panel 14 is fixedly joined to the pillar outer panel 13, the pillar reinforcement 15, and the roof side rail outer 1 at plural spot-welding portions SW1, SW2, SW3 of its upper portion.

As shown in the same figure, the rear-side joint flange portion 14b of the pillar inner panel 14 is fixedly joined to the pillar outer panel 13, the pillar reinforcement 15, and the roof side rail outer 1 at plural spot-welding portions SW4, SW5, SW6 of its upper portion. The pillar inner panel 14 and the pillar reinforcement 15 are formed by a high-rigidity member which has a larger thickness and a higher tension (tensile strength) than the pillar outer panel 13, so that these members 14, 15 have the superior flexibility of external design of the pillar outer panel 13 and the high pillar rigidity. Herein, in FIG. 3, the respective welding portions are denoted by X marc.

As shown in FIG. 1, the front-side joint flange portion 14a of the pillar inner panel 14 is fixedly joined to the pillar outer panel 13, the pillar reinforcement 15, and the side sill 9 at plural spot-welding portions SW7, SW8, SW9 of its lower portion.

As shown in the same figure, the rear-side joint flange portion 14b of the pillar inner panel 14 is fixedly joined to the pillar outer panel 13, the pillar reinforcement 15, and the side sill 9 at plural spot-welding portions SW10, SW11, SW12 of its lower portion. Herein, in FIG. 4, the respective welding portions are shown by small rectangular portions indicated in white.

As shown in FIGS. 1 and 3, ridgeline portions X1, X2 are provided at the pillar inner panel 14 between the rear-side joint flange portion 14b and the inner panel body 14c such that they extend roughly vertically from both the side sill 9 and the roof side rail 5. The ridgeline portion X2 extending roughly vertically downward from the roof side rail 5 (see FIG. 3) and the ridgeline portion X1 extending roughly vertically upward from the side sill 9 (see FIG. 1) are configured to be continuous in a vertical direction.

Further, as shown in FIG. 3, a load-transmission restraint portion 17 is provided between the above-described ridgeline portion X2 and the welding portion SW4 where an upper end portion of the pillar inner panel 14 is welded to the pillar outer panel 13 and the roof side rail 5. The load-transmission restraint portion 17 is configured to have a longitudinal width which is wider than that of a central portion, in the vertical direction, of the center pillar 12 and be substantially flat.

Likewise, as shown in FIG. 1, a load-transmission restraint portion 18 is provided between the above-described ridgeline portion X1 and the welding portion SW12 where a lower end portion of the pillar inner panel 14 is welded to the pillar outer panel 13 and the side sill 9. The load-transmission restraint portion 18 is configured to have a longitudinal width which is wider than that of the central portion, in the vertical direction, of the center pillar 12 and be substantially flat.

That is, as shown in FIG. 3, the ridgeline portion X2 is configured such that its upper end side is gradually spaced apart from a rear edge of the joint flange portion 14b, not extending along a curved shape of the rear edge of the joint flange portion 14b which extends upward and rearward, so that the distance between the ridgeline portion X2 and the welding portion SW4 at the upper end portion of the center pillar 12 becomes wider. Thus, there is provided the load-transmission restraint portion 17 having the wide longitudinal width, i.e., the wide distance between the both X2, SW4, and being substantially flat.

Likewise, as shown in FIG. 1, the ridgeline portion X1 is configured such that its lower end side is gradually spaced apart from the rear edge of the joint flange portion 14b which extends downward and rearward, not extending along a curved shape of the rear edge of the joint flange portion 14b, so that the distance between the ridgeline portion X1 and the welding portion SW12 at the lower end portion of the center pillar 12 is wide. Thus, there is provided the load-transmission restraint portion 18 having the wide longitudinal width, i.e., the wide distance between the both X1, SW12, and being substantially flat. Herein, while these load-transmission restraint portions 17, 18 may be provided only at the pillar inner panel 14, it is preferable that these portions 17, 18 be provided at the pillar reinforcement 15. Thereby, the load-transmission position from the pillar reinforcement 15 to the pillar inner panel 14 can be spaced apart from the welding portions SW4, SW12 of the pillar inner panel 14 and located close to the ridgeline portions X1, X2 of the pillar inner panel 14. Accordingly, the load transmission to the welding portions SW4, SW12 can be further restrained, and also the load-absorption deformation at the ridgeline portions X1, X2 can be further promoted. Further, as shown in FIG. 2, it may be preferable that a slant portion 15a be provided at an adjacent portion of the pillar reinforcement 15 which is located adjacent to the load-transmission restraint portion 18. This slant portion 15a is configured to slant in the vehicle longitudinal direction relative to a wall face which is located adjacently to and outward, in the vehicle width direction, of the above-described adjacent portion and extends outward in the vehicle width direction, or a wall face which is located adjacently, in the vertical direction, to the above-described adjacent portion and extends in the vehicle width direction. Thereby, the vehicle-width-direction load transmission to the pillar inner panel 14 can be further restrained, preventing any decrease of the vehicle-width-direction proof stress of the center pillar. In FIG. 1, reference character 19a denotes a joint flange portion which is formed by bending an end portion of the floor panel 19, and reference character 20 denotes a roof panel in FIG. 4. In the figures, an arrow R shows a vehicle rearward direction, an arrow IN shows a vehicle inward direction, and an arrow OUT shows a vehicle outward direction.

As described above, the side vehicle-body structure of the automotive vehicle of the first embodiment shown in FIGS. 1-4 comprises the center pillar 12, the upper end of which is fixedly joined to the roof side rail 5 and the lower end portion of which is fixedly joined to the side sill 9, the center pillar 12 having the closed cross section 16 extending in the vertical direction which is formed by the pillar outer panel 13 or the pillar reinforcement 15 and the pillar inner panel 14, wherein the ridgeline portions X2, X1 are provided at the pillar inner panel 14 such that the ridgeline portions X2, X1 extend substantially vertically from at least one of the roof side rail 5 and the side sill 9 (from both the roof side rail 5 and the side sill 9 in the present embodiment), and the load-transmission restraint portions 18, 17 are provided between the ridgeline portions X1, X2 and the welding portions SW12, SW4 of the pillar end portion where the pillar inner panel 14 is welded to the pillar outer panel 13 or the pillar reinforcement 15 and the side sill 9 or the roof side rail 5, the load-transmission restraint portions 18, 17 being configured to have the longitudinal width which is wider than that of the central portion, in the vertical direction, of the center pillar 12 and be substantially flat (see FIGS. 1, 2 and 3).

According to this structure, since there are provided the load-transmission restraint portions 18, 17 having the wide longitudinal width and being substantially flat, large deformation of the vehicle-compartment inside of the pillar inner panel 14, which may be caused by the side-collision load transmitted via the ridgeline portions X1, X2, is properly allowed and progress of the deformation to the vicinity of the welding portions SW12, SW4 is restrained, so that both ensuring of a sufficient degree of the load absorption at the center pillar 12 and preventing of the input of the excessive load to the welding portions SW12, SW4 of the pillar end portion can be attained properly.

Accordingly, the load-absorption deformation of the center pillar 12 can be increased, and the deformation progress to the welding portions SW12, SW4 of the pillar end portion can be restrained, thereby preventing that the welding portions SW12, SW4 of the pillar end portion of the pillar inner panel SW12, SW4 are made to peel off by the side-collision load. Consequently, it can be restrained that the proof stress, in the vehicle width direction, of the center pillar 12 decreases and the degree of the inward displacement of the center pillar 12 increases.

Embodiment 2

Figure 5:
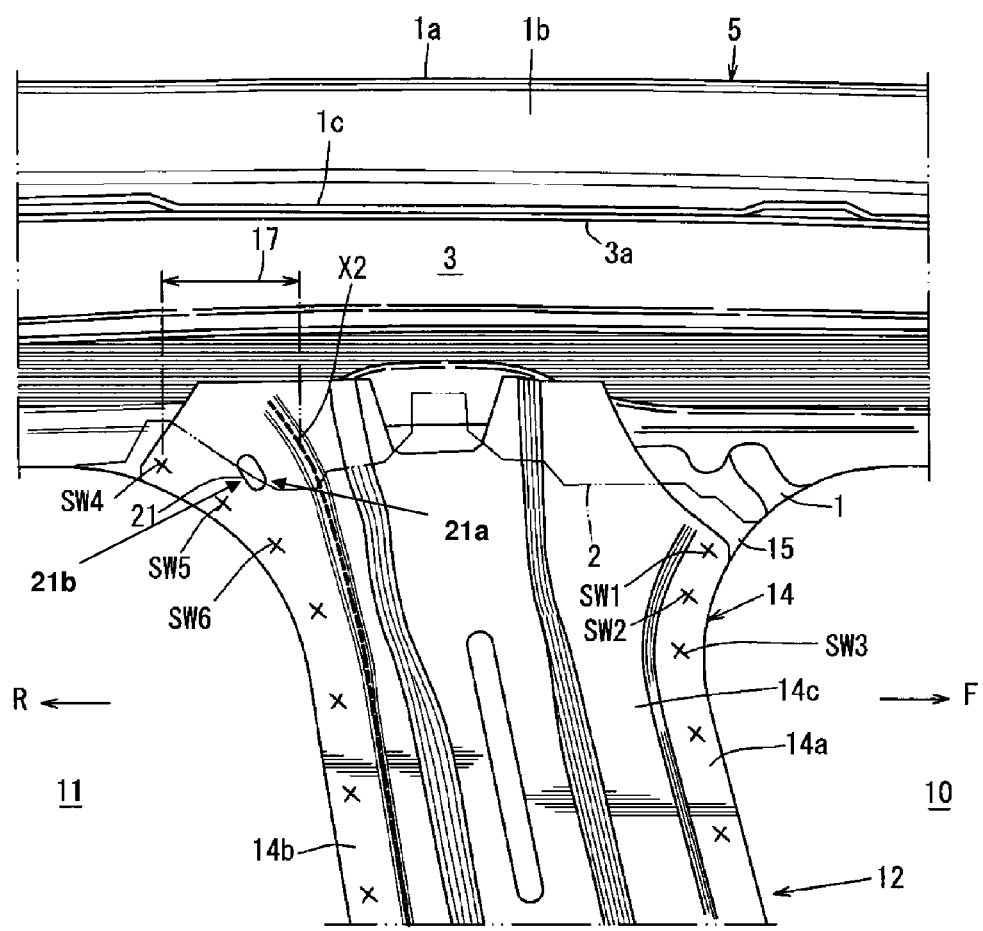
FIG. 5 is a side view showing an upper structure of the center pillar having a hole portion for deformation transmission restraint according to a second embodiment of the present invention.
Figure 6:
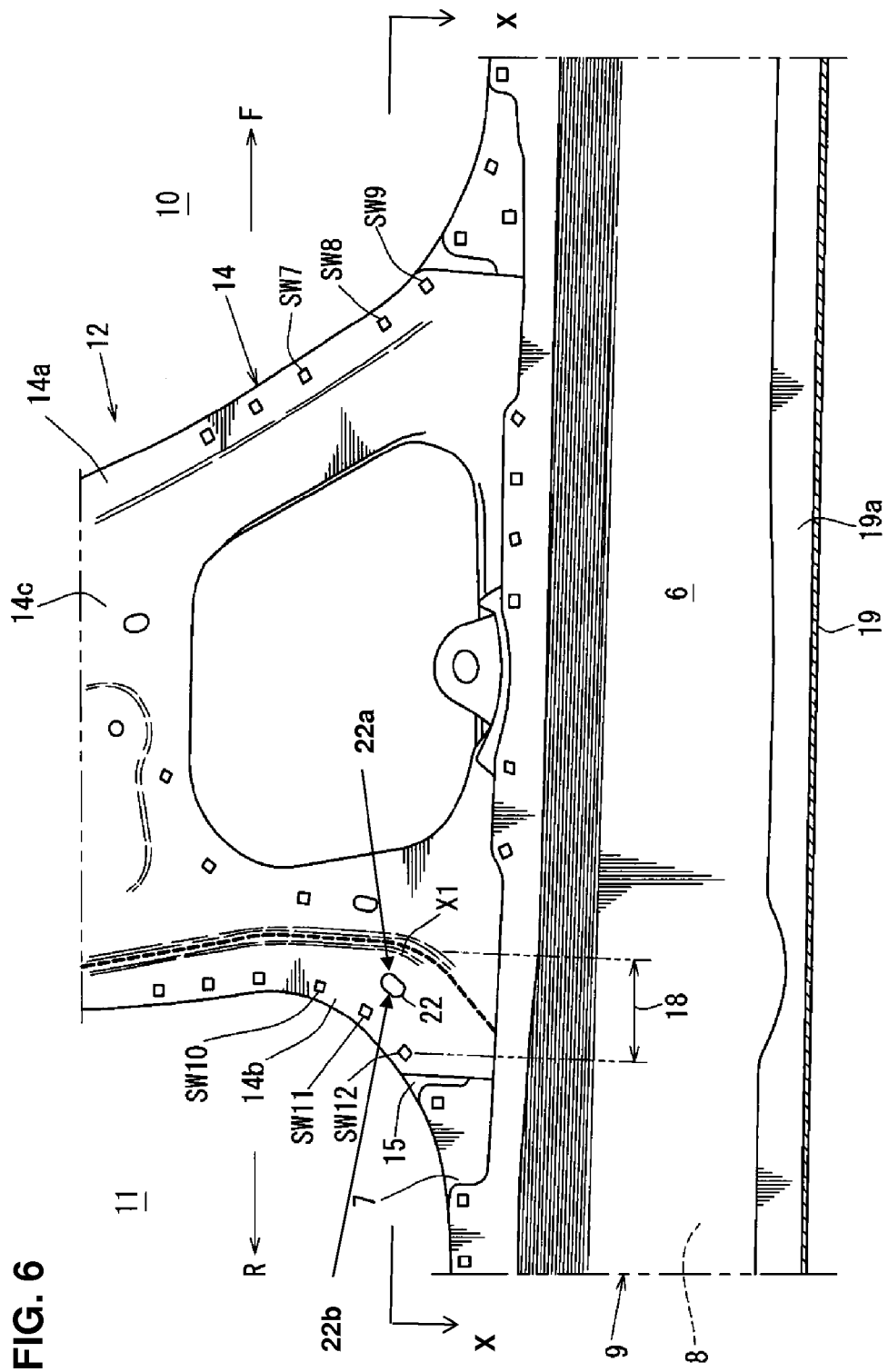
FIG. 6 is a side view showing a lower structure of the center pillar having a hole portion for deformation transmission restraint according to the second embodiment of the present invention.
Figure 7:
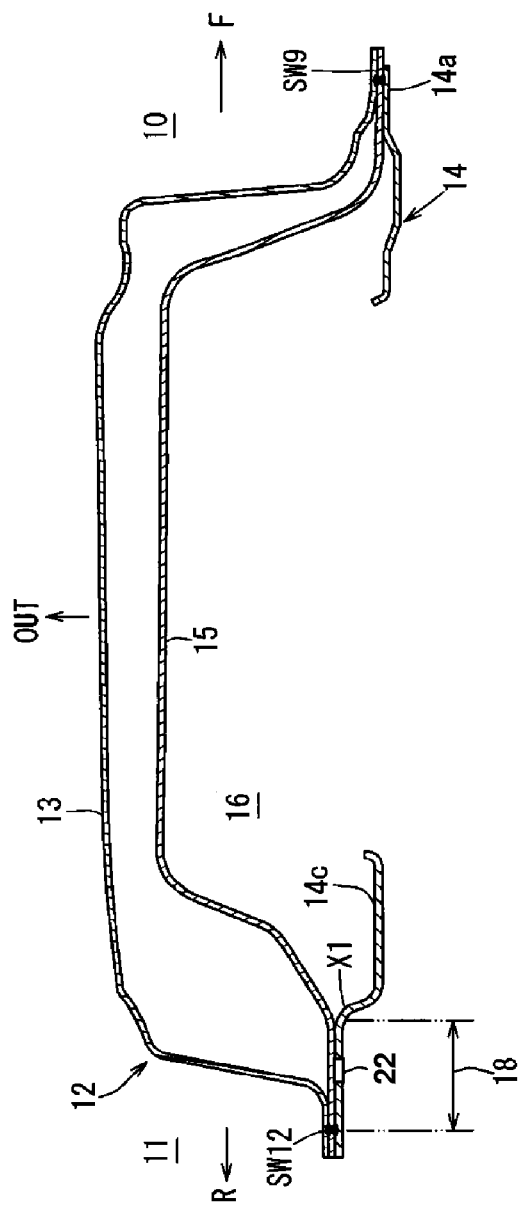
FIG. 7 is a sectional view taken along line X-X of FIG. 6.

FIGS. 5 and 6 show another embodiment of the side vehicle-body structure of the automotive vehicle. FIG. 5 is a side view showing an upper structure of the center pillar having a hole portion for deformation transmission restraint, FIG. 6 is a side view showing a lower structure of the center pillar having a hole portion for deformation transmission restraint, and FIG. 7 is a sectional view taken along line X-X of FIG. 6.

As shown in FIG. 5, a long hole 21 as a hole portion for deformation transmission restraint is provided between the ridgeline portion X2 and the welding portion SW4 of the pillar upper end portion, in addition to the above-described structure of the first embodiment, in particular, in addition to the structure shown in FIG. 3.

A lower portion of the above-described long hole 21 which is provided between the welding portions SW4 of the pillar upper end portion on the side of the roof side rail 5 and the ridgeline portion X2 is configured such that a section 21a which is located on the side of the ridgeline portion X2 in a vehicle longitudinal direction has a smaller curvature-radius than a section 21b which is located on the side of the welding portion SW4 of the pillar end portion in the vehicle longitudinal direction. Herein, since the long hole 21 is described as the hole portion in the present embodiment, the curvature radius of the lower half-circular portion of the long hole 21 is the same as that of the upper half-circular portion. However, this hole portion may be configured in order to achieve the expected aim such that only the lower half-circular portion has the small curvature-radius but the upper half-circular portion has the curvature radius which is larger than that of the lower half-curvature portion.

As described above, the long hole 21 as the hole portion for deformation transmission restraint is provided between the ridgeline portion X2 and the welding portion SW4 of the pillar upper end portion as shown in FIG. 5. Accordingly, the dendritic (wrinkle-shaped) stress-transmission path which grows toward the welding portion SW4 of the pillar upper end portion according to an enlargement of deformation difference between the ridgeline portion X2 and the vicinity of the welding portion SW4 of the pillar upper end portion is received at the long hole 21 for deformation transmission restraint, so that the load-absorption deformation around the long hole 21 can be promoted. Accordingly, the deformation transmission to the vicinity of the welding portion SW4 of the pillar upper end portion can be restrained properly, promoting the load-absorption deformation of the pillar inner panel 14.

Further, the lower portion of the long hole 21 provided between the welding portions SW4 of the pillar upper end portion on the side of the roof side rail 5 and the ridgeline portion X2 is configured such that the section 21a located on the side of the ridgeline portion X2 in the vehicle longitudinal direction has the smaller curvature-radius than the section 21b located on the side of the welding portion SW4 of the pillar end portion in the vehicle longitudinal direction as described above (see FIG. 5). According to this structure, since the section 21a of the lower portion of the long hole 21 which is located on the central side in the vehicle longitudinal direction, i.e., on the side of the ridgeline portion X2, has the smaller curvature-radius than the section 21b which is located on the outward side (i.e., rearward), in the vehicle longitudinal direction, of the center pillar, i.e., on the side of the welding portion SW4 of the pillar upper end portion, the stress is easily concentrated at this small curvature-radius section 21a, so that deformation of this portion can be promoted. That is, the load-transmission path extends from a center-pillar load-input point side of the ridgeline portion X2 near the welding portion SW4 of the pillar upper end portion (i.e., from a lower side relative to the welding portion SW4 of the pillar upper end portion), the transmitted load can be effectively transferred to the load-absorption deformation at the above-described section 21a of the long hole 21 having the small curvature-radius.

In particular, since the section 21a of the lower portion of the long hole 21 which is located below the welding portion SW4 and on the central side, in the vehicle longitudinal direction, of the pillar has the smaller curvature-radius than the section 21b which is located below the welding portion SW4 and on the side of the welding portion SW4 of the pillar upper end portion, the load-transmission path which extends in a dendritic shape from below the welding portion SW4 of the pillar upper end portion is blocked by the central portion in the pillar vertical portion before the welding portion SW4 of the pillar upper end portion so that the progress of the deformation can be surely induced to the vicinity of the ridgeline portion X2.

Accordingly, the deformation progress to the periphery of the welding portion SW4 of the pillar upper end portion can be restrained more properly compared to a case in which the hole portion is of a perfect-circular shape, so that the size of the long hole 21 can be set to be smaller. Consequently, it can be properly prevented that the proof stress, in the vehicle width direction, of the center pillar 12 decreases because of the long hole 21.

In other words, in order to reduce the shearing force inputted to the welding portion SW4 of the pillar upper end portion, the long hole 21 for deformation transmission restraint is provided at the portion before the welding portion SW4 of the pillar upper end portion (on a center-pillar load-input side) such that the stress is so concentrated at the periphery of the long hole 21 that the welding portion SW4 of the pillar upper end portion does not peel off. Further, the hole portion is the long hole 21, so that the peripheral length of the hole portion is relatively long and the hole diameter is relatively small (a small opening area). Accordingly, a breakage risk caused by the hole portion can be reduced.

As shown in FIG. 6, a long hole 22 as the hole portion for deformation transmission restraint is provided between the ridgeline portion X1 and the welding portion SW12 of the pillar lower end portion, in addition to the above-described structure of the first embodiment, in particular, in addition to the structure shown in FIG. 1. Further, a lower portion of the above-described long hole 22 which is provided between the welding portions SW12 of the pillar lower end portion on the side of the side sill 9 and the ridgeline portion X1 is configured such that a section 22a which is located on the side of the ridgeline portion X1 in the vehicle longitudinal direction has a smaller curvature-radius than a section 22b which is located on the side of the welding portion SW12 of the pillar lower end portion in the vehicle longitudinal direction.

Herein, since the long hole 22 is described as the hole portion in the present embodiment, the curvature radius of the upper half-circular portion of the long hole 22 is the same as that of the lower half-circular portion. However, this hole portion may be configured in order to achieve the expected aim such that only the upper half-circular portion has the small curvature-radius but the lower half-circular portion has the curvature radius which is larger than that of the upper half-curvature portion.

As described above, the long hole 22 as the hole portion for deformation transmission restraint is provided between the ridgeline portion X1 and the welding portion SW12 of the pillar lower end portion as shown in FIG. 6. Accordingly, the dendritic (wrinkle-shaped) stress-transmission path which grows toward the welding portion SW12 of the pillar lower end portion according to an enlargement of deformation difference between the ridgeline portion X1 and the vicinity of the welding portion SW12 of the pillar lower end portion is received at the long hole 22 for deformation transmission restraint, so that the load-absorption deformation around the long hole 22 can be promoted. Accordingly, the deformation transmission to the vicinity of the welding portion SW12 of the pillar lower end portion can be restrained properly, promoting the load-absorption deformation of the pillar inner panel 14.

Further, on the side of the side sill 9 of the center pillar 12, the section 22a of the lower portion of the long hole 22 which is located above the welding portion SW12 of the pillar lower end portion and on the central side, in the vehicle longitudinal direction, of the pillar has the smaller curvature-radius than the section 22b which is located above the welding portion SW12 of the pillar lower end portion and on the outward side (i.e., rearward), in the vehicle longitudinal direction, of the pillar, i.e., near the welding portion SW12 (see FIG. 6). According to this structure, since the section 22a of the upper portion of the long hole 22 which is located on the central side, in the vehicle longitudinal direction, of the pillar and above the welding portion SW12 has the smaller curvature-radius than the section 22b which is located on the outward side (i.e., rearward), in the vehicle longitudinal direction, of the pillar and above the welding portion SW12, the stress is easily concentrated at this small curvature-radius section 22a, so that deformation of this portion can be promoted. That is, the load-transmission path extends from a center-pillar load-input point side of the ridgeline portion X1 near the welding portion SW12 of the pillar lower end portion (i.e., from an upper side relative to the welding portion SW12 of the pillar lower end portion), the load-transmission path is so blocked by the upper portion of the long hole 22 which is located above the welding portion SW12 of the pillar lower end portion that the transmitted load can be effectively transferred to the load-absorption deformation at the above-described section 22a of the long hole 22 having the small curvature-radius.

Accordingly, the deformation progress to the periphery of the welding portion SW12 of the pillar lower end portion can be restrained more properly compared to the case in which the hole portion is of the perfect-circular shape, so that the size of the long hole 22 can be set to be smaller. Consequently, it can be properly prevented that the proof stress, in the vehicle width direction, of the center pillar 12 decreases because of the long hole 22.

In other words, in order to reduce the shearing force inputted to the welding portion SW12 of the pillar lower end portion, the long hole 22 for deformation transmission restraint is provided at the portion before the welding portion SW12 of the pillar lower end portion (on the center-pillar load-input side) such that the stress is so concentrated at the periphery of the long hole 22 that the welding portion SW12 of the pillar lower end portion does not peel off. Further, the hole portion is the long hole 22, so that the peripheral length of the hole portion is relatively long and the hole diameter is relatively small (a small opening area). Accordingly, the breakage risk caused by the hole portion can be reduced.

Herein, the amount (degree) of strain (deformation) increases as the hole diameter of the hole portion for deformation transmission restraint becomes larger, and a larger hole diameter not only increases the risk of the breaking from the hole portion but also decreases the proof stress, in the vehicle width direction, of the center pillar 12. Therefore, it is preferable that the hole portion be configured to have a long peripheral length and a small opening area, so the long hole (the long hole 21 of FIG. 5, the long hole 22 of FIG. 6) is preferable.

In the present embodiment, as shown in FIG. 7, the long hole 22 as the hole portion for deformation transmission restraint is formed at the pillar inner panel 14, and not formed at the pillar reinforcement 15. Thereby, the long hole 22 having the large opening area and the long peripheral length is provided, without decreasing the proof stress of the center pillar 12 excessively, so that it can be efficiently prevented that the collision-load absorption deformation is transmitted to the welding portion. Further, the long hole 22 faces a range of the load-transmission restraint portion 18 at the joint flange portion 15b of the pillar reinforcement 15 and is covered with the pillar reinforcement 15. Accordingly, proper sound insulation, water proof, or dust entry can be achieved, without adding any other shut-off member to shield the long hole 22, such as a cover cap, restraining the deformation progress to the welding portion SW12 of the pillar lower end portion which is caused by the collision load at the load-transmission restraint portion 18. Herein, any other panel than the pillar reinforcement, such as the pillar outer panel or a panel forming the side sill, may be used as the panel to shield the long hole 22.

Figure 8:
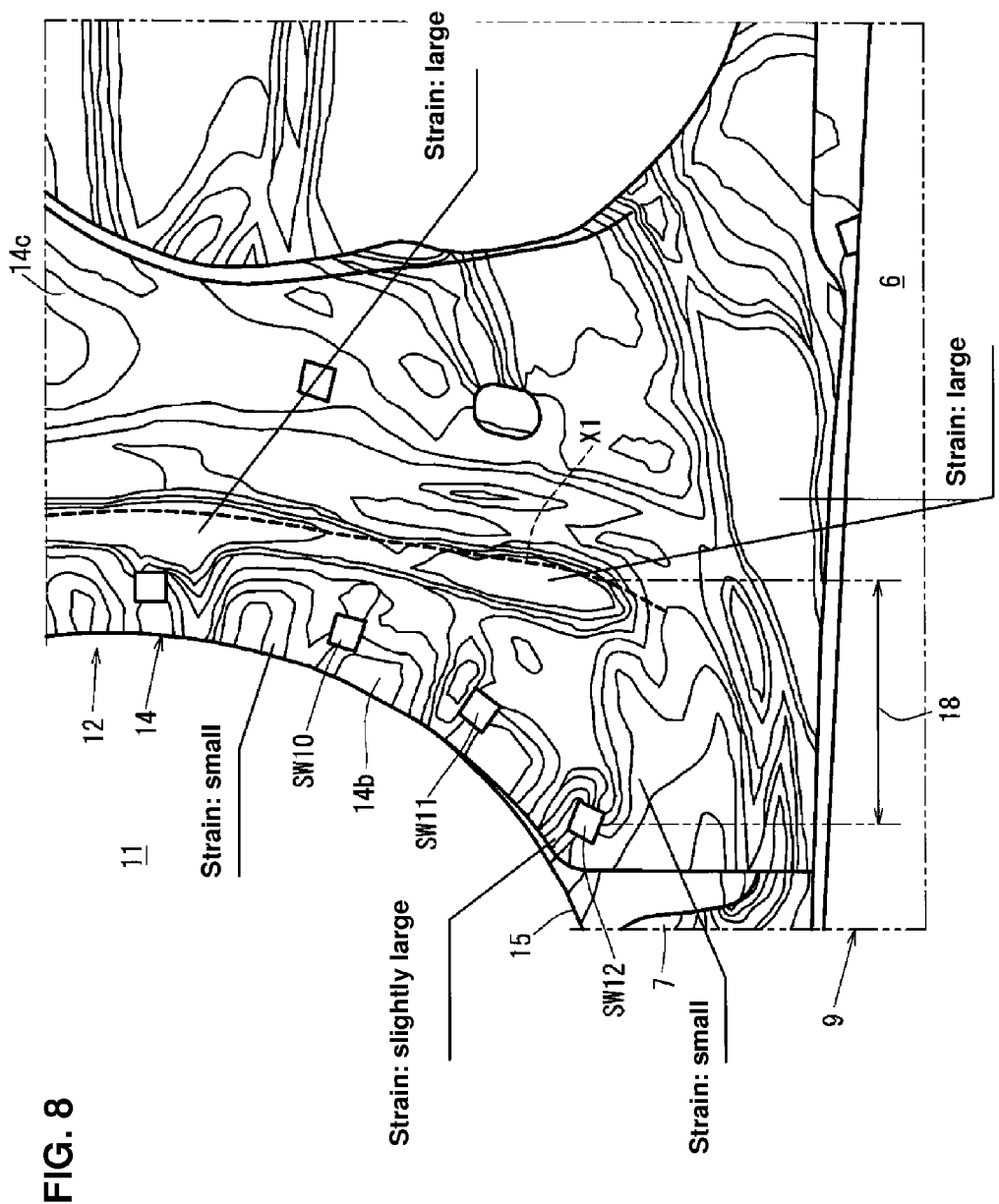
FIG. 8 is an explanatory diagram showing a state of strain (deformation) which is generated at the side vehicle-body structure of the automotive vehicle of the first embodiment.
Figure 9:
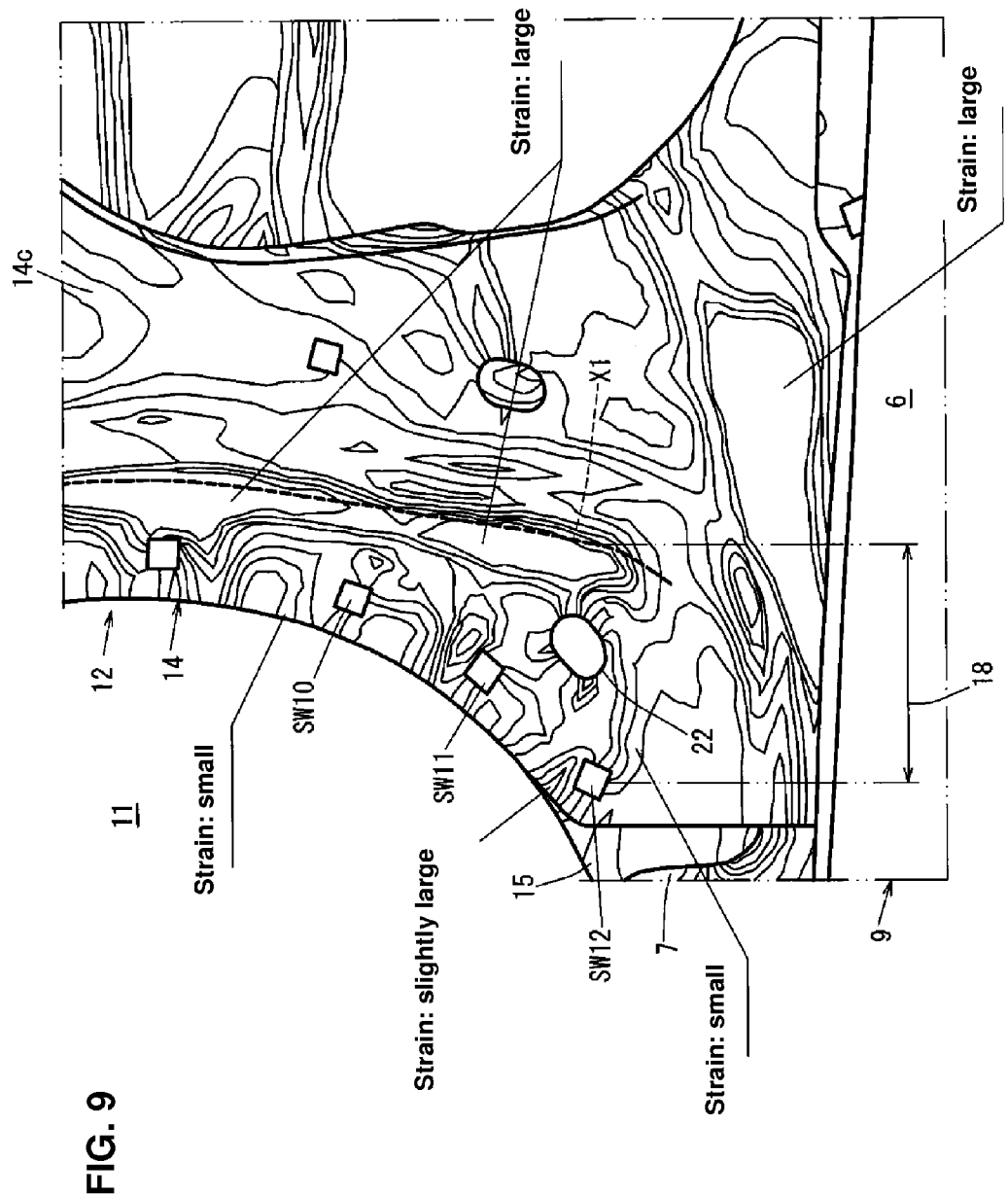
FIG. 9 is an explanatory diagram showing a state of strain (deformation) which is generated at the side vehicle-body structure of the automotive vehicle of the second embodiment.

FIG. 8 is an explanatory diagram showing verification of a state of strain (deformation) which is generated at the structure of the first embodiment shown in FIG. 1. FIG. 9 is an explanatory diagram showing verification of a state of strain (deformation) which is generated at the structure of the second embodiment shown in FIG. 6.

As shown in FIG. 8, it has been apparent in the first embodiment that the strain is concentrated at the ridgeline portion X1 so that the shearing stress is not inputted to the welding portion SW12 of the pillar lower end portion by providing the load-transmission restraint portion 18.

As shown in FIG. 9, it has been apparent in the second embodiment that the strain is concentrated at the ridgeline portion X1 and around the upper hole edge portion of the long hole 22 by providing the long hole 22 for deformation transmission restraint, in addition to the load-transmission restraint portion 18, so that the shearing stress inputted to the welding portion SW12 of the pillar lower end portion becomes smaller.

Figure 10:
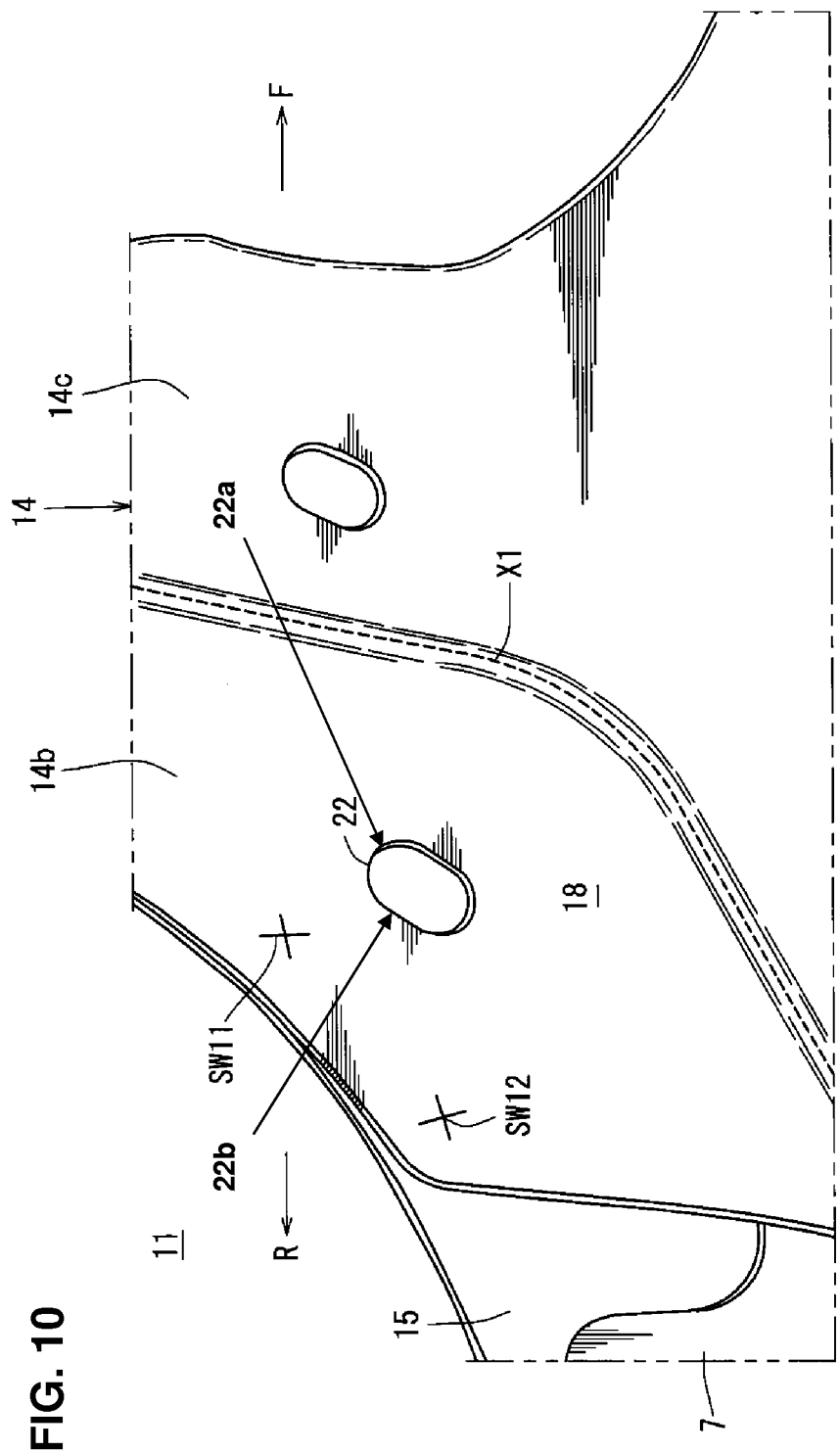
FIG. 10 is a major-part enlarged side view showing an embodiment of the hole portion for deformation transmission restraint.
Figure 11:
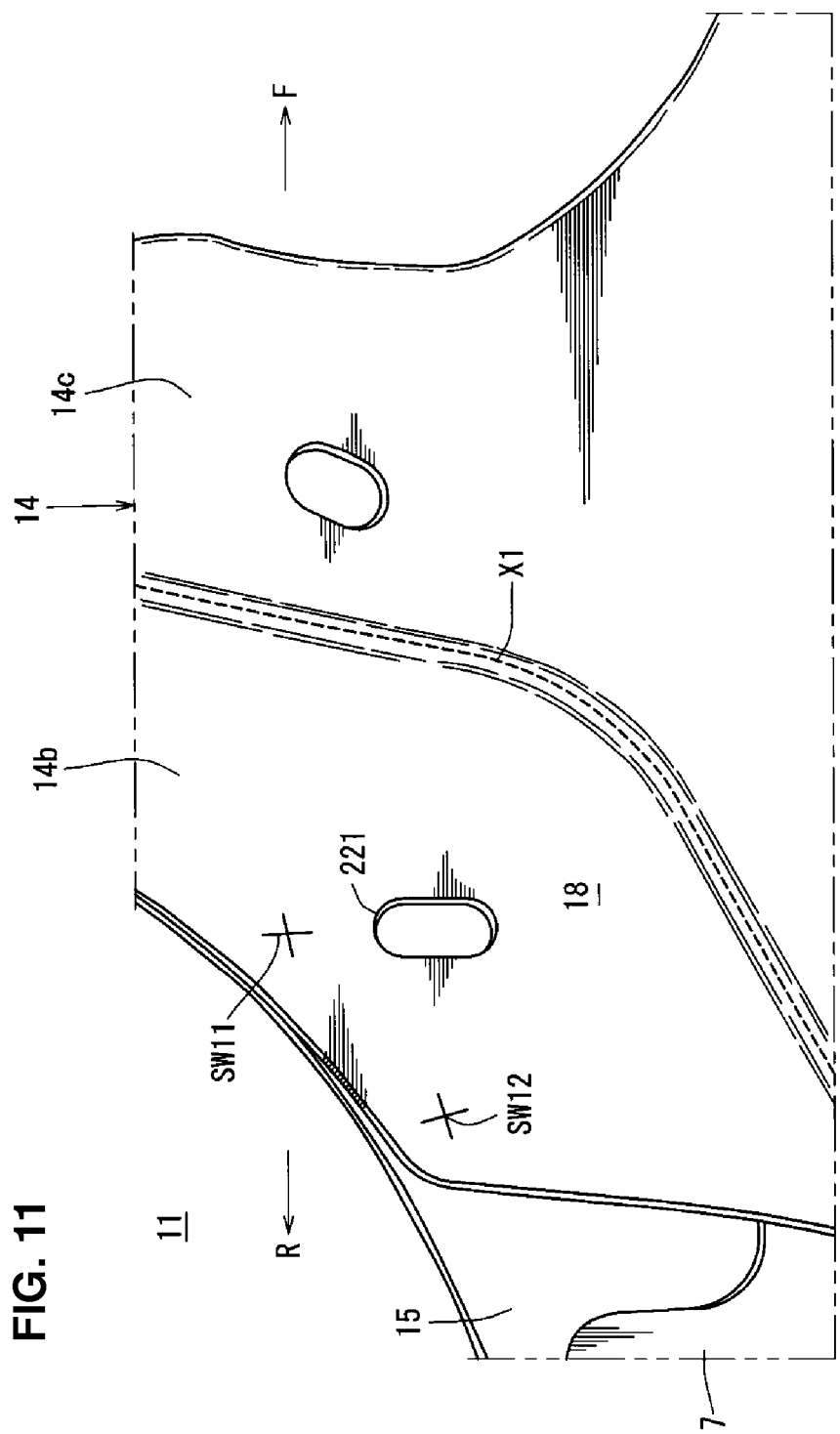
FIG. 11 is a major-part enlarged side view showing a first comparative example of the hole portion for deformation transmission restraint.
Figure 12:
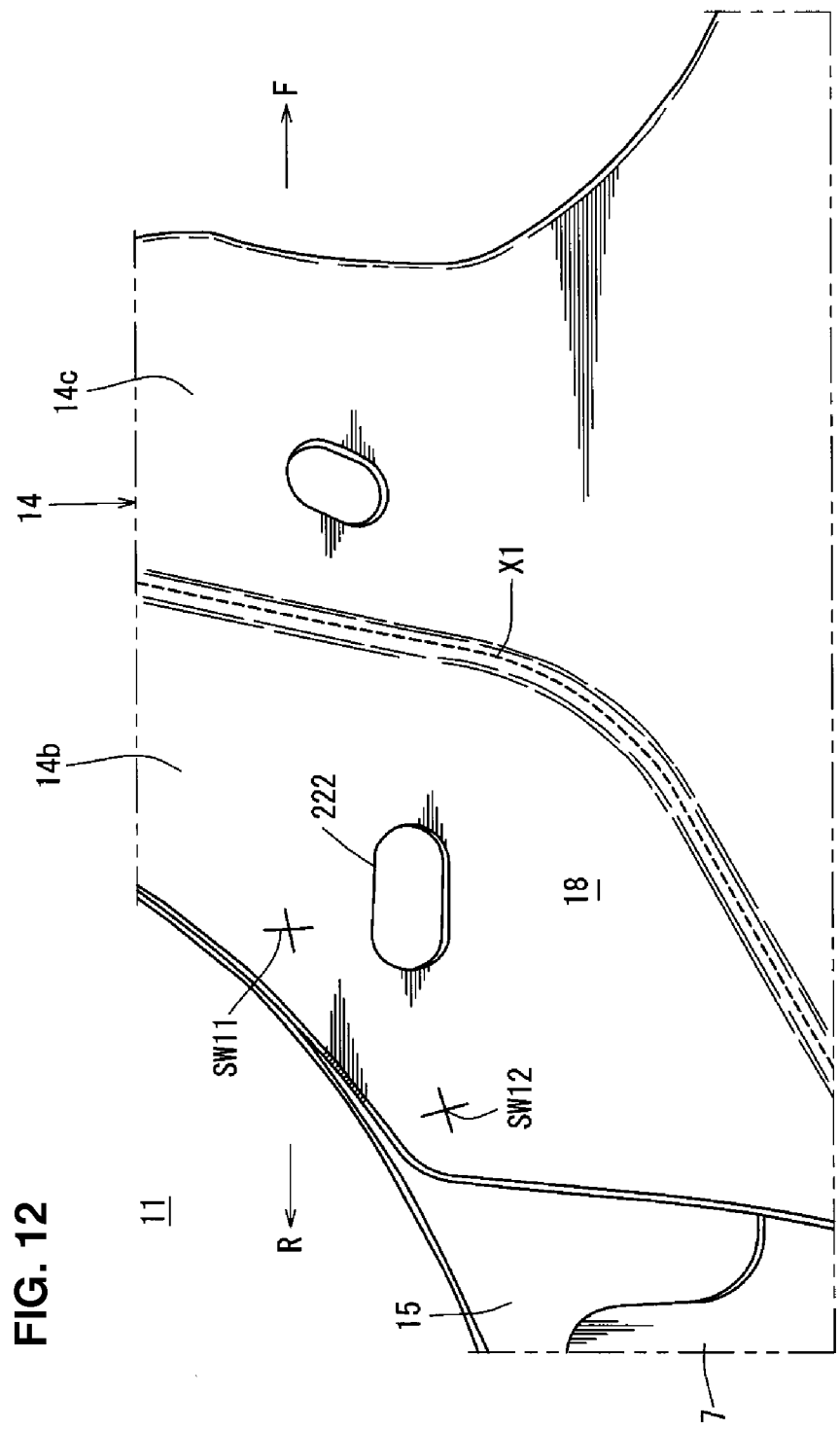
FIG. 12 is a major-part enlarged side view showing a second comparative example of the hole portion for deformation transmission restraint.
Figure 13:
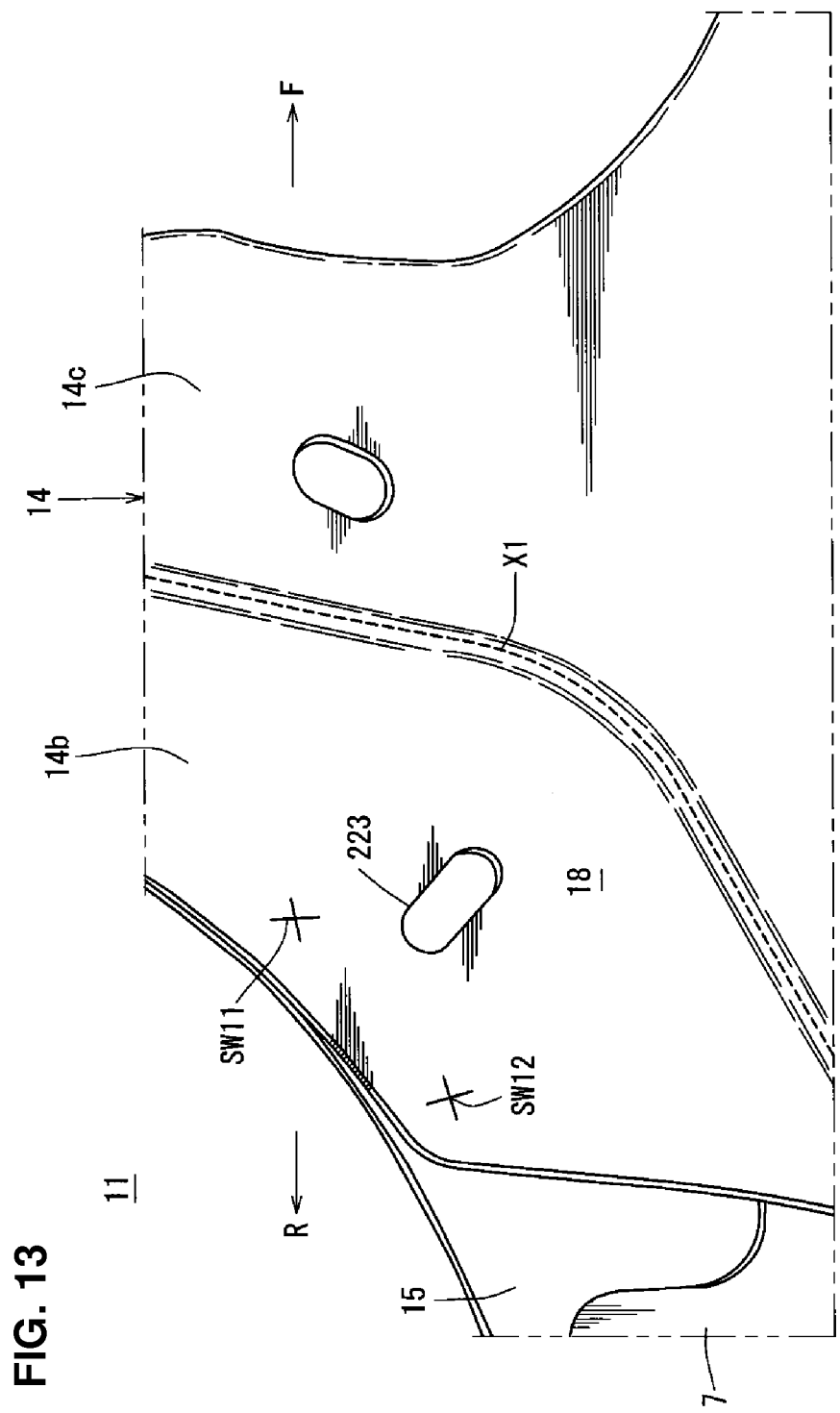
FIG. 13 is a major-part enlarged side view showing a third comparative example of the hole portion for deformation transmission restraint.
Figure 14:
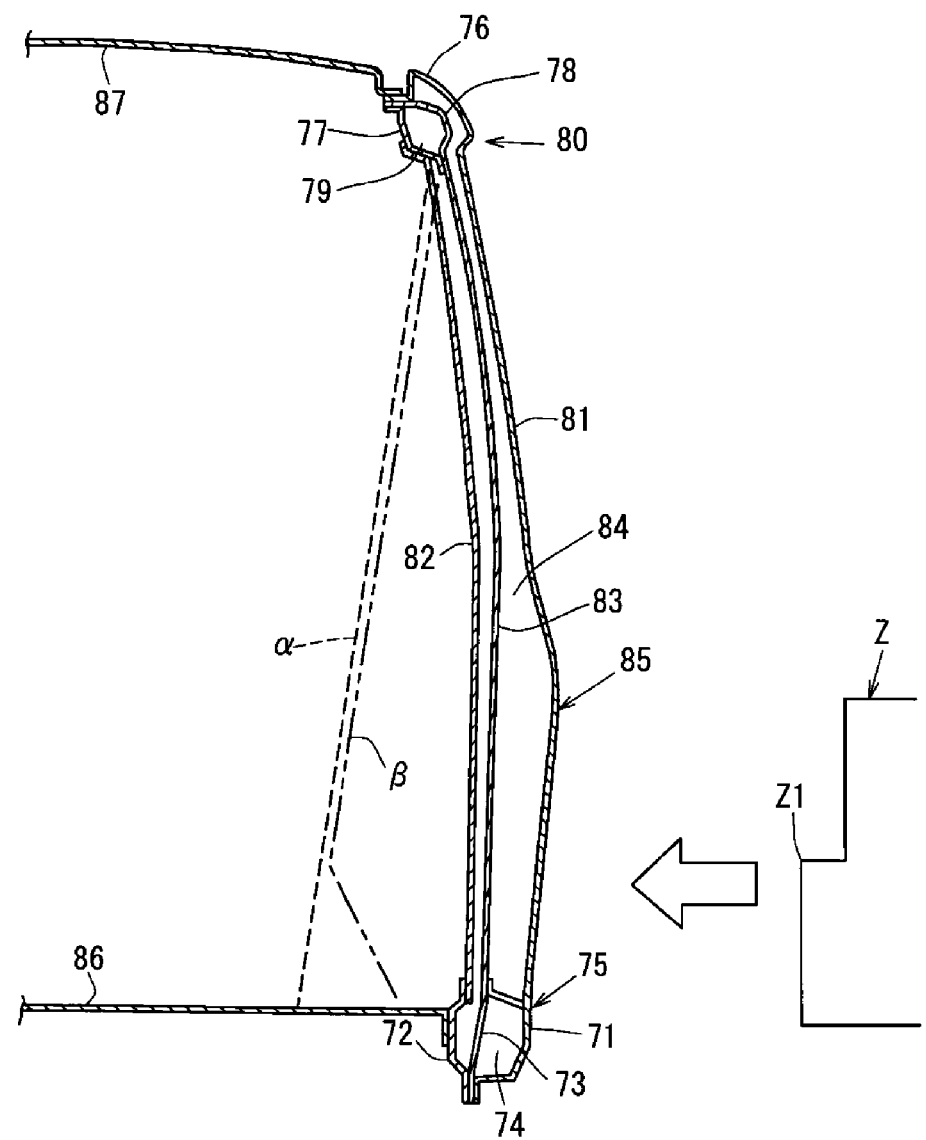
FIG. 14 is an exemplary diagram showing two manners of receiving a side-collision load in the side vehicle-body structure of the automotive vehicle.

FIGS. 10-13 are figures showing verification of a dispersion state of strain according to the direction of the hole portion. FIG. 10 is a major-part enlarged side view showing the embodiment of the long hole 22 for deformation transmission restraint (the second embodiment shown in FIG. 6). FIG. 11 is a major-part enlarged side view showing a first comparative example of the hole portion for deformation transmission restraint. FIG. 12 is a major-part enlarged side view showing a second comparative example of the hole portion for deformation transmission restraint. FIG. 13 is a major-part enlarged side view showing a third comparative example of the hole portion for deformation transmission restraint.

FIG. 10 shows the side vehicle-body structure having the long hole 22 of the second embodiment shown in FIGS. 6 and 9, in which the long hole 22 is positioned at the center, in the vehicle longitudinal direction, between the welding portion SW12 of the pillar lower end portion and the ridgeline portion X1, and an direction of the long hole 22 is substantially parallel to the ridgeline portion X1. According to this structure, the strain is generated at an expected position as shown in FIG. 9, so that the shearing force inputted to the welding portion SW12 of the pillar lower end portion can be reduced.

A long hole 221 of the first comparative example shown in FIG. 11 is positioned at the center, in the vehicle longitudinal direction, between the welding portion SW12 of the pillar lower end portion and the ridgeline portion X1, and the direction of the long hole 221 is vertical. According to the shape of this long hole 221, a lower end of the long hole 221 is spaced apart from the ridgeline portion X1 from a productivity aspect. Therefore, a rear hole edge of the long hole 221 is closer to the welding portion SW12, so that the effect (performance) that the strain can be generated at an expected position which is spaced apart from the welding portion SW12 is smaller.

A long hole 222 of the second comparative example shown in FIG. 12 is positioned at the center, in the vehicle longitudinal direction, between the welding portion SW12 of the pillar lower end portion and the ridgeline portion X1, and the direction of the long hole 222 is horizontal. Therefore, a rear hole edge of the long hole 222 is extremely close to the welding portion SW12, so that the effect (performance) that the shearing force inputted to the welding portion SW12 can be reduced is smaller than that of the case of the long hole 221 of FIG. 11. The reason for this may be that the curvature radius of the section of the upper portion of the long hole 222 on the side of the welding portion SW12 in the vehicle longitudinal direction is so smaller than that of the section (the longitudinally central section) closer to the ridgeline portion X1 that the stress is concentrated at this smaller curvature-radius section, so that the strain occurrence near the welding portion SW12 is promoted.

A long hole 223 of the third comparative example shown in FIG. 13 is positioned at the center, in the vehicle longitudinal direction, between the welding portion SW12 of the pillar lower end portion and the ridgeline portion X1, and the direction of the long hole 223 is roughly perpendicular to the ridgeline portion X1. According to this structure, the strain cannot be generated at the expected position, so that the effect (performance) that the shearing force inputted to the welding portion SW12 can be reduced was not recognized substantially. Accordingly, it is assumed that the effect of the deformation-progress restraint by the hole portion may decrease in a case in which the shape of the hole portion is configured such that the curvature radius of the welding-portion-side section of a portion (located on a central side, in the vertical direction, of the center pillar which is upstream of the load transmission path) of the hole portion is smaller than that of the ridgeline-portion-side section of the portion (located on the central side, in the vertical direction, of the center pillar which is upstream of the load transmission path) of the hole portion. Therefore, as shown in FIGS. 10 and 11, it is preferable that the long holes 22, 221 be configured such that their sections (22a) which are located on the side of the ridgeline portion X1 of the pillar lower end portion, i.e., on the central side, in the vehicle longitudinal direction, of the pillar, and on the upper side, i.e., on the central side, in the vertical direction, of the pillar, has the smaller curvature-radius than their sections (22b) which are located on the side of the welding portion SW12 of the pillar lower end portion, i.e., on the outward side (i.e., rearward), in the vehicle longitudinal direction, of the pillar and near the welding portion SW12 of the pillar lower end portion. Likewise, it is also preferable that the long hole 21 be configured such that the section which is located on the side of the ridgeline portion X2 of the pillar upper end portion, i.e., on the central side, in the vehicle longitudinal direction, of the pillar, and on the lower side, i.e., on the central side, in the vertical direction, of the pillar, has the smaller curvature-radius than the section which is located on the side of the welding portion SW4 of the pillar upper end portion, i.e., on the outward side (i.e., rearward), in the vehicle longitudinal direction, of the pillar and near the welding portion SW4 of the pillar upper end portion. Further, it is more preferable that the long hole 22 be configured such that it opens substantially in parallel to the ridgeline portion X1 as shown in FIG. 10. In other words, it is preferable that the long hole 22 be configured such that the section 22a which is located on the central side, in the vehicle longitudinal direction, of the pillar and on the central side, in the vertical direction, of the pillar has the smaller curvature-radius than the section 22b which is located on the outward side (i.e., rearward), in the vehicle longitudinal direction, of the pillar and on the central side, in the vertical direction, of the pillar. Thereby, the strain can be made to occur at the expected position which is spaced apart from the welding portion SW12, shortening the distance, in the vehicle longitudinal direction, between the end portion of the long hole 22 which is located on the central side, in the vertical direction, of the pillar and the welding portion SW12.

While the hole portion for deformation transmission restraint of the present invention corresponds to the long holes 21, 22 of the embodiments, the present invention should not be limited to the above-described embodiments, and any other modifications or improvements may be applied within the scope of a spirit of the present invention.

For example, the welding portions SW1-SW12 exemplified in the above-described embodiments can be an arc-welding portion or a lazar-welding portion in place of the spot-welding portion.

What is claimed is:

1. A side vehicle-body structure of an automotive vehicle comprising a center pillar, an upper end of which is welded to a roof side rail and a lower end portion of which is welded to a side sill, the center pillar having a closed cross section extending in a vertical direction which is formed by a pillar inner panel and a pillar outer panel or a pillar reinforcement which are positioned on an outward side, in a vehicle width direction, of the pillar inner panel, wherein said pillar inner panel comprises a front-side joint flange portion which is positioned at a front side of the pillar inner panel and welded to said pillar outer panel or said pillar reinforcement at a welding portion, a rear-side joint flange portion which is positioned at a rear side of the pillar inner panel and welded to said pillar outer panel or said pillar reinforcement at a welding portion, and an inner panel body which is positioned between said front-side and rear-side joint flange portions, a ridgeline portion is provided at the pillar inner panel of said center pillar between at least one of said front-side and rear-side joint flange portions and said inner panel body such that the ridgeline portion extends substantially vertically from at least one of the roof side rail and the side sill, and a pillar end portion of at least one of said front-side and rear-side joint flange portions where the pillar inner panel is welded to the pillar outer panel or the pillar reinforcement and the side sill or the roof side rail is configured such that a longitudinal width between said welding portion and said ridgeline portion is wider than that between said welding portion and said ridgeline portion of a central-side portion, in the vertical direction, of the center pillar.

2. The side vehicle-body structure of an automotive vehicle of claim 1, wherein a hole portion for deformation transmission restraint is provided at said pillar end portion between said ridgeline portion and said welding portion.

3. The side vehicle-body structure of an automotive vehicle of claim 2, wherein an upper portion of said hole portion which is provided between the ridgeline portion and the welding portion of the pillar end portion on the side of the side sill is configured such that a section located on the side of said ridgeline portion in a vehicle longitudinal direction has a smaller curvature-radius than a section located on the side of said welding portion of the pillar end portion in the vehicle longitudinal direction.

4. The side vehicle-body structure of an automotive vehicle of claim 2, wherein a lower portion of said hole portion which is provided between the ridgeline portion and the welding portion of the pillar end portion on the side of the roof side rail is configured such that a section located on the side of said ridgeline portion in a vehicle longitudinal direction has a smaller curvature-radius than a section located on the side of said welding portion of the pillar end portion in the vehicle longitudinal direction.

5. The side vehicle-body structure of an automotive vehicle of claim 2, wherein an upper portion of said hole portion which is provided between the ridgeline portion and the welding portion of the pillar end portion on the side of the side sill is configured such that a section located on the side of said ridgeline portion in a vehicle longitudinal direction has a smaller curvature-radius than a section located on the side of said welding portion of the pillar end portion in the vehicle longitudinal direction, and a lower portion of said hole portion which is provided between the ridgeline portion and the welding portion of the pillar end portion on the side of the roof side rail is configured such that a section located on the side of said ridgeline portion in a vehicle longitudinal direction has a smaller curvature-radius than a section located on the side of said welding portion of the pillar end portion in the vehicle longitudinal direction.

6. The side vehicle-body structure of an automotive vehicle of claim 2, wherein said hole portion which is provided between the ridgeline portion and the welding portion of the pillar end portion on the side of the side sill is configured such that an upper portion thereof is located above said welding portion of the pillar end portion in the vertical direction.

7. The side vehicle-body structure of an automotive vehicle of claim 2, wherein said hole portion which is provided between the ridgeline portion and the welding portion of the pillar end portion on the side of the roof side rail is configured such that a lower portion thereof is located below said welding portion of the pillar end portion in the vertical direction.

8. The side vehicle-body structure of an automotive vehicle of claim 2, wherein said hole portion which is provided between the ridgeline portion and the welding portion of the pillar end portion on the side of the side sill is configured such that an upper portion thereof is located above said welding portion of the pillar end portion in the vertical direction, and said hole portion which is provided between the ridgeline portion and the welding portion of the pillar end portion on the side of the roof side rail is configured such that a lower portion thereof is located below said welding portion of the pillar end portion in the vertical direction.

9. The side vehicle-body structure of an automotive vehicle of claim 2, wherein said hole portion is formed at the pillar inner panel and covered with another panel.

* * * * *